July 17, 1962 C. C. WILLHITE 3,044,705

LIMITER SYSTEMS

Filed Dec. 8, 1958 6 Sheets-Sheet 1

INVENTOR
C. C. WILLHITE
BY Walter M. Hill
ATTORNEY

July 17, 1962 C. C. WILLHITE 3,044,705
LIMITER SYSTEMS
Filed Dec. 8, 1958 6 Sheets-Sheet 2

INVENTOR
C.C. WILLHITE
BY Walter M. Hill
ATTORNEY

July 17, 1962 C. C. WILLHITE 3,044,705

LIMITER SYSTEMS

Filed Dec. 8, 1958 6 Sheets-Sheet 3

INVENTOR
C. C. WILLHITE

BY Walter M. Hill

ATTORNEY

LIMITER SYSTEMS

Filed Dec. 8, 1958

INVENTOR
C. C. WILLHITE
BY
Walter M. Hill
ATTORNEY

INVENTOR
C. C. WILLHITE
BY Walter M. Hill
ATTORNEY

July 17, 1962 C. C. WILLHITE 3,044,705

LIMITER SYSTEMS

Filed Dec. 8, 1958

6 Sheets-Sheet 6

INVENTOR
C. C. WILLHITE
BY Walter M. Hill
ATTORNEY 3,044,705
Patented July 17, 1962

3,044,705

LIMITER SYSTEMS

Charles C. Willhite, Convent Station, N.J., assignor to Bell Telephone Laboratories, Incorporated, New York, N.Y., a corporation of New York Filed Dec. 8, 1958, Ser. No. 779,020
10 Claims. (Cl. 235—189)

This invention relates to systems for selectively limiting a total vector quantity comprised of two or more component vector quantities.

In control systems, e.g., missile guidance and automatic machinery, the physical motion of the machine components is controlled by signals. Taking the case of the missile, it may be guided by steering orders or signals issued by the ground guidance and control equipment. These orders are calculated by a computer and transmitted to the missile via the beam of a missile tracking radar. Upon receipt of an order the electronic control system in the missile deflects the missile control surfaces until a lateral acceleration of the magnitude of the received order is experienced.

The total lateral acceleration of the missile is controlled by two pairs of ailerons. These are mounted such that the acceleration caused by one pair is ninety degrees, or in space quadrature, from that caused by the other pair. Separate orders are issued to each pair.

The magnitude of the steering orders issued by the computer must be limited to values determined by aerodynamic considerations and the structural strength of the missile itself, and thus it has been the practice to place maximum limits on the orders issued to each set of control surfaces. However, inasmuch as the two sets of control surfaces are operated independently of one another, a "full" deflection of both sets will result in 1.4 times the lateral acceleration caused by a full deflection of one set. This, of course, can result in missile failure unless the maximum orders issued to each set of control surfaces are fixed at values such that the total lateral acceleration never exceeds that which is permissible.

If a given maximum acceleration order is fixed for each aileron pair, then the total lateral acceleration that can be achieved will fall within an acceleration "square." However, the acceleration limits of the missile itself, being determined primarily by the structural design thereof, are nearly constant as a function of lateral acceleration direction. That is, the acceleration limits of the missile proper fall with a "circle." A "circular" or "near-circular" order limiting would be superior to a square because the prevention of missile failure requires that the corners of the square fall on the edge of the circle and, therefore, in some acceleration directions a circular order limiting would permit forty percent more acceleration than a square order limiting. Thus, it is desirable not to simply place fixed limits on the orders controlling the aileron pairs, but rather arrange the limits so that the vector sum thereof will never exceed a given magnitude.

Similar problems arise in the control of automatic machinery. It may, for example, be desirable that the operating portion of the machine move certain distances in predetermined orthogonal directions, but that the total movement never exceed a critical value. Assuming selected order signals cause movement in selected orthogonal directions, these order signals can, of course, each be limited so that the vector sum thereof never exceeds the determined critical value. However, this is done only by unnecessarily restricting the degree of movement in each of the said orthogonal directions.

It is an object, therefore, of this invention to limit a total vector order magnitude independently of the order direction, in a system where the total order is composed of two or more components.

It is a still further object of this invention to limit a total vector magnitude in a manner which satisfies the actual requirements on both order magnitude and direction, in a system where the total order is composed of two or more components.

In the numerous control systems now in use, the output orders or signals may represent the analogs of any one of a number of types of data. Thus an output order may be the analog of translational or lateral acceleration, velocity, distance, force, pressure, charge, frequency, time, et cetera. In such systems where two or more orders are sent to the same piece of equipment, it is frequently desirable that the total order magnitude be confined or limited in some selected fashion. Thus, if the total order is represented as a vector quantity comprised of two or more components, orthogonal or otherwise, it may be desirable to limit the vector magnitude to a greater extent in some directions than in others, or to even limit it in some irregular fashion in the various directions it may assume. Such a limiting, however, cannot readily be accomplished by simply imposing maximum limits on the several components thereof.

It is accordingly a further object of this invention to impose limits, on a total vector quantity, which may be of a variety of magnitudes in the different directions that the total vector may assume.

The invention in its broadest aspects comprises the concept of limiting the component vector quantities between selected limits, transforming the limiting component vector quantities into vector quantities which are angularly disposed with respect to said limited vector quantities, and then applying a second set of limits to the transformed vector quantities. The second set of limits may be the same as or different from the limits initially applied. Also, after the second stage of limiting the components may again be transformed and again limited.

In one specific embodiment of the invention the aforementioned circular or near-circular order limiting may be achieved. To this end, orthogonal component vectors are limited, to the same extent, in a pair of amplifier type limiters. This, then, initially limits the total vector quantity to a square. The limited components are then rotated (i.e., transformed) through an angle of forty-five degrees and square limiting of the original magnitude is applied to the rotated components in a second pair of amplifier type limiters. The total vector sum of the new limited components is thus limited to an octagon, the octagon being defined by the common area of two equal squares with common centers and rotated forty-five degrees with respect to each other. For many purposes this approach to a circle would be sufficient. However, it will be appreciated that an even closer approach to a circle may be achieved by providing several additional stages of limiting and rotation.

By selection of the limits imposed and the degree and stages of rotation, the pattern within which the total vector must fall can be made to take almost any desired shape or configuration. Thus, in two dimensions the total vector may be limted to a square, rectangle, octagon, any given polygon, an approximation to a circle or to an ellipse, et cetera. Further, the restriction on the length and direction of the total vector may be made to have a minimum as well as a maximum; or going one step further, it may be made to have regions within the main area or pattern where the total vector is not permitted.

The principle involved applies as well to three component vectors as to two, or to three dimensional components.

These and other objects and features of the invention may be better understood by a consideration of the following detailed description when read in connection with the drawings in which.

Figure 1:
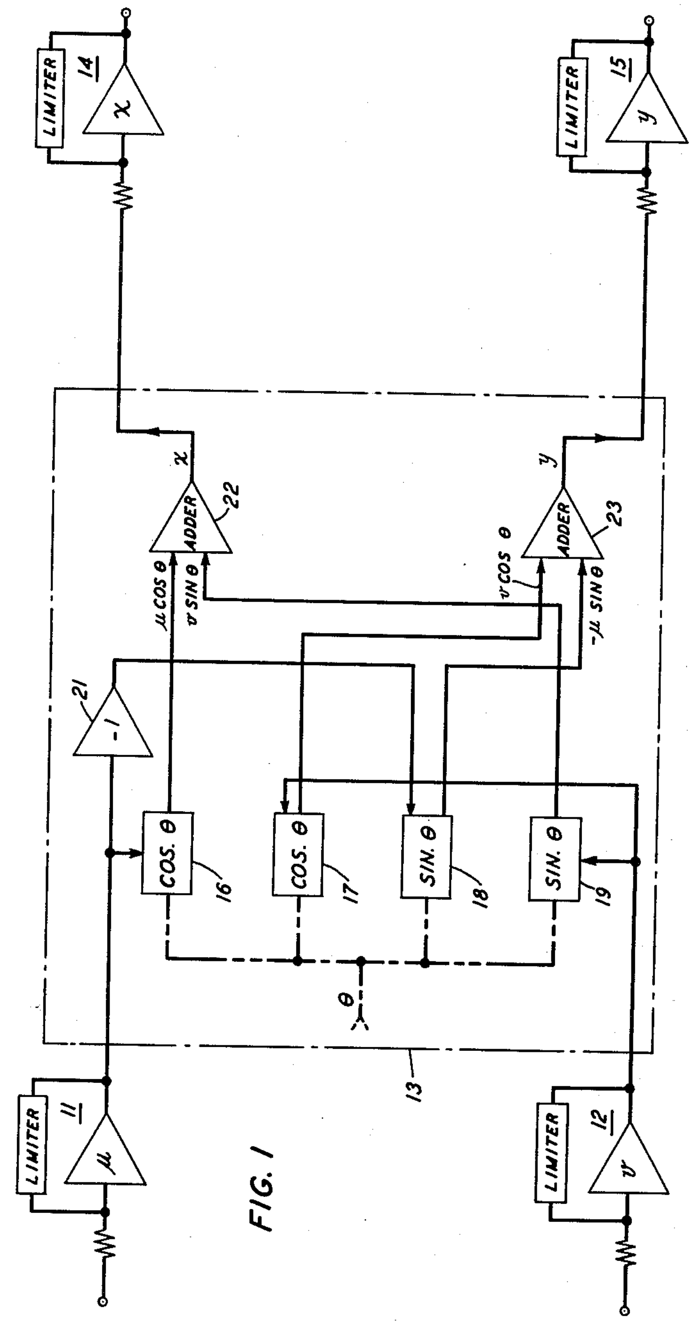
FIG. 1 is a schematic diagram in block form of a limiter system in accordance with the present invention.

Referring now to FIG. 1, there is shown therein a first pair of amplifier type limiters 11 and 12, a rotator 13 enclosed by the dotted box, and a second pair of amplifier type limiters 14 and 15. The invention is not dependent upon or restricted in any fashion to any particular limiter circuit and, as will be apparent to those skilled in the art, the only limitation on the limiter circuits that may be utilized is that dictated by the function to be performed. Limiters (also known as function generators) of various configurations are shown and described in "Analog Methods in Computation and Simulation," by Soroka, McGraw-Hill Book Company (pp. 203–207); and "Electronic Analog Computers," by Korn and Korn, McGraw-Hill Book Company (pp. 271–279).

Figure 1B:
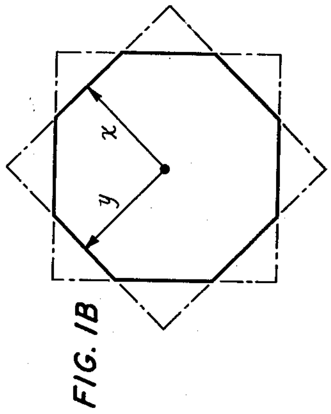
FIGS. 1A and 1B are vector diagrams useful in explaining the operation of the system of FIG. 1.
Figure 1A:
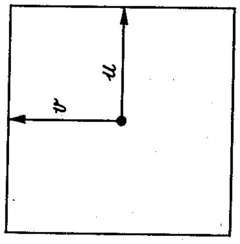

With a first signal or component quantity, designated $u$, applied to limiter 11 and another signal or component quantity, designated $v$, applied to limiter 12, the vector sum thereof will be limited to a square, as illustrated in FIG. 1A. It has been assumed, in FIG. 1A, that the limits applied to each signal are equal and of the same magnitude in both the positive and negative directions. If either of these conditions does not prevail the vector sum will then be limited to a rectangle. Further, for purposes of explanation of the invention, the component quantities, $u$, $v$ shall be assumed to be orthogonal; however, it will be clear to those skilled in the art that the principles of the invention are equally applicable to component quantities which bear some other angular relationship to each other.

The limited, vector quantities $u$, $v$ are fed to rotator 13 wherein they are rotated through any predetermined angle. Such rotation devices are well known in the art and the one utilized in the system of FIG. 1 is essentially the same as that disclosed in "Electronic Instruments," by Greenwood, Holdam and MacRae, volume 21, Radiation Laboratory Series (pp. 158–160).

The rotation or transformation of the vector components $u$, $v$ lying along the $u$, $v$ coordinate axes, to the coordinate axes $x$, $y$ can be expressed by the equations $$x = u\cos\theta + v\sin\theta$$
$$y = -u\sin\theta + v\cos\theta$$

where $\theta$ is the angle through which the axes are rotated. Accordingly, if the trigonometric functions of the vectors $u$ and $v$ are combined in the indicated manner, the total vector is then expressed in terms of vectors lying along the $x$, $y$ axes.

To perform the desired rotation, devices producing sines and cosines must be used. These may each produce either a single sine or cosine function (nonlinear potentiometers) or both sine and cosine together (resolvers, square-card sine potentiometers, phase-shifting capacitors). Such devices are discussed in detail in the aforementioned Radiation Laboratory textbook (pp. 104–120). In the system of FIG. 1, single sine and cosine elements 16, 17, 18 and 19 are used. The limited vector quantity $u$ is fed directly to the ($\cos\theta$) elements 16 and to the ($\sin\theta$) element 18 via the ($-1$) amplifier 21. The latter is simply a unity gain amplifier that inverts the sign or polarity of the input signal. The limited vector quantity $v$ is fed directly to the ($\sin\theta$) element 19 and to the ($\cos\theta$) element 17. The degree of rotation of the vectors is determined by the angular displacement of an input shaft coupled to each of the elements 16–19. The products $u\cos\theta$ and $v\sin\theta$) are formed in elements 16 and 19 and added in the adder or summing amplifier 22 to give $x$; similarly, ($v\cos\theta$)and ($-u\sin\theta$) are formed in elements 17 and 18 and added in summing amplifier 23 to give $y$.

The quantities $x$, $y$ are then fed to the limiters 14 and 15 wherein they are limited to any given extent. In the explanatory diagram, FIG. 1B, the vectors are shown as being rotated through an angle of forty-five degrees, with limiting of the original magnitude applied to the rotated components. Thus the total vector is limited to an octagon, the octagon being defined by the common area (as shown in solid lines) of two equal squares with common centers and rotated forty-five degrees with respect to each other.

If circular limiting is desired, as in the case of a missile, the octagon "limit" will for most cases prove to be a sufficiently close approximation. However, it will be realized from the foregoing that an even closer approach may be had by providing additional stages of limiting and rotation. For example, three rotational stages may be used, each providing a twenty-two and one-half degree vector rotation, with limiting of the same amount applied to the original and successively rotated vectors.

Figure 2:
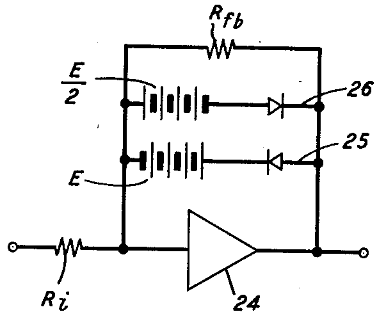
FIG. 2 is a typical, amplifier type limited circuit that may be used in the system of FIG. 1.
Figure 2A:
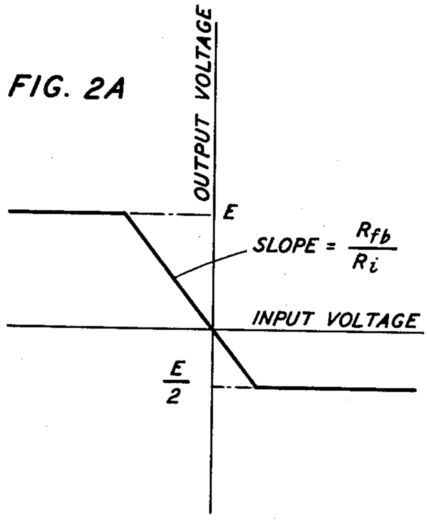
FIG. 2A illustrates the transfer characteristics of the circuit of FIG. 2.

In FIG. 2 there is shown a typical amplifier type limiter that may be used in the system of FIG. 1, the transfer characteristics thereof being shown in FIG. 2A. The limiter comprises a standard operational amplifier 24 having multiple feedback paths. Within the limits imposed, the output voltage varies as an inverse function of the input voltage, the exact relationship between the two being determined by the respective values of the feedback resistance ($R_{fb}$) and the input resistance ($R_i$), as shown in FIG. 2A. The feedback path 25, comprising a diode and voltage source E, limits the output voltage to a positive value equal to E. If the output voltage were to attempt to exceed E, a low impedance conducting path would exist through feedback path 25, and any additional input current to the amplifier would be balanced by current through this branch with no increase in output voltage. Similarly, the feedback path 26, comprising a diode and voltage source E/2, limits the output voltage to a negative value equal to E/2.

Figure 3:
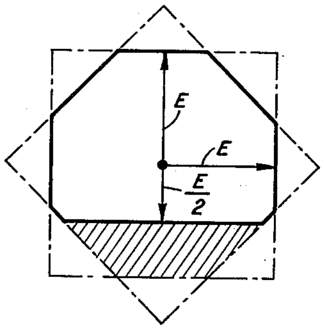
FIG. 3 illustrates the variation that can be obtained in the vector pattern of the system of FIG. 1 through the inclusion therein of the circuit of FIG. 2.

FIG. 3 illustrates the variation that may be obtained in the vector pattern of the system of FIG. 1 should the limiter circuit of FIG. 2 be substituted for limiter 12. In this instance, the $v$ vector is limited in the negative direction to one-half the original value (i.e., E/2), the other limits remaining as they were. Thus it will be seen that the modification has the effect of eliminating the shaded portion of the total vector pattern.

Figure 4:
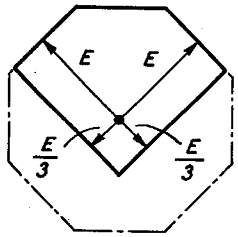
FIG. 4 illustrates a still further variation in the vector pattern of the system of FIG. 1.

To obtain a total vector pattern such as that shown in FIG. 4, the $x$ and $y$ vector components are limited in the negative direction to one-third the original value, all other limits remaining the same. Thus, from the few foregoing examples, it will be clear that the total vector may be limited to almost any desired polygonal pattern simply by controlling the limits imposed and the degree of vector rotation. Further, just as successive square limiting can provide an approximation to a circle, so in similar fashion an approximation to an ellipse can be achieved through several stages of rectangular limiting.

In the description so far it has been assumed that preselected fixed limits and degrees of rotation are applied. It will be clear, however, to those skilled in the art, that the limits applied in each amplifier limiter circuit need not be fixed but rather can be varied continuously or periodically in almost any desired manner. Likewise, the degree of angular rotation may be varied automatically in response to some signal. Such a variation in the total vector pattern may be desirable in certain instances. For example, in the case of missiles, it may at times be necessary to alter the total vector pattern as the missie altitude or missile velocity increases.

Figure 5:
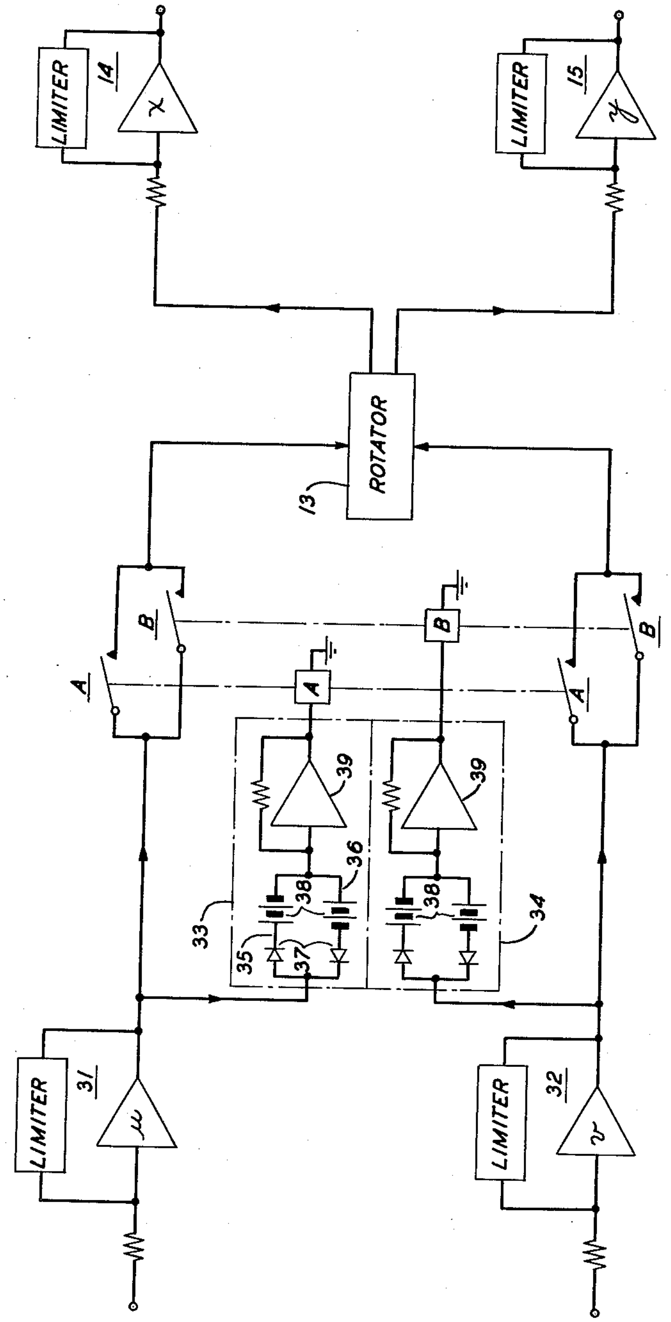
FIG. 5 is a schematic diagram of another embodiment of the present invention.

In the embodiment shown in FIG. 5, the $u$ and $v$ vector components are restricted to a minimum value as well as a maximum. With the input component quantities applied to the limiters 31 and 32, the vector sum thereof will be limited, in maximum value, to a rectangle, as illustrated at 29 in FIG. 5A. The $u$ vector is limited to the same extent in the positive and negative directions, while the $v$ vector is limited to a much greater extent in the negative direction.

The outputs of limiters 31 and 32 are delivered to the rotator 13, via separate pairs of parallel connected switching contacts, and to the limiters 33 and 34, respectively. These latter limiters provide the energization current for relay coils A and B, respectively, and the coils in turn serve to actuate or "close" the normally "open" switch contacts A and B. Limiters 33 and 34 coact with the relay units A and B to limit or restrict the $u$ and $v$ vector quantities to predetermined minimum values.

Figure 6:
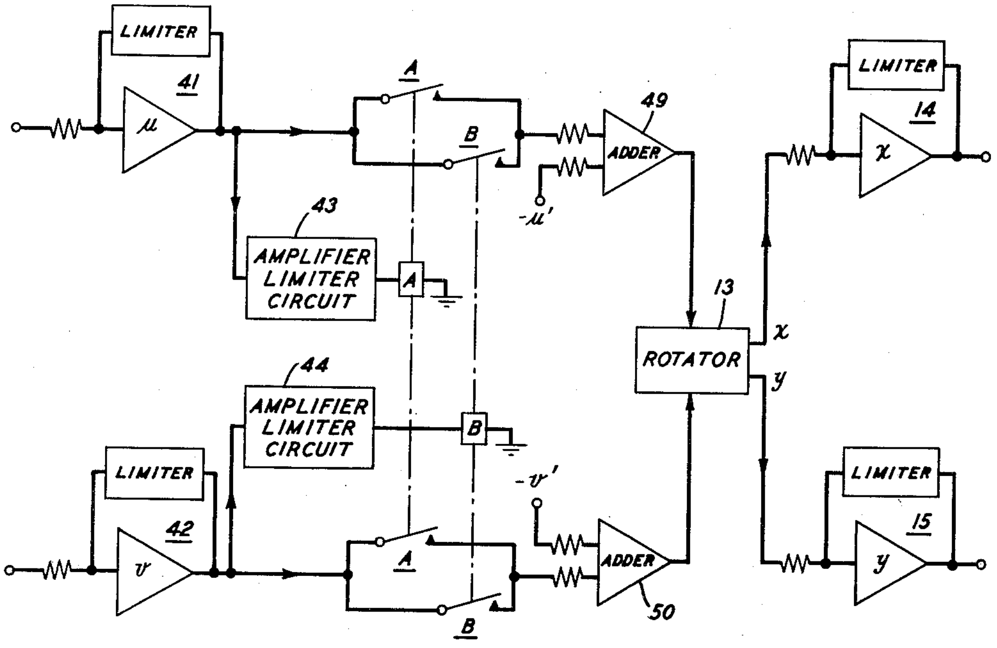
FIG. 6 is a schematic diagram in block form of still another embodiment of the invention.

The limiters 33 and 34 are of the type shown in FIG. 6.10($h$) of the Soroka book and each comprises a standard operational amplifier 39 having a high impedance feedback and a pair of input series circuits. Considering the circuit for limiting the $u$ vector, the output of limiter 31 is fed to the pair of parallel connected series paths 35 and 36, each of which includes a diode 37 and a voltage source 38. The polarity of the voltage sources 38 and the direction of easy current flow of the diodes 37 are reversed for the two paths.

In the series path 35, voltage source 38 back-biases the diode 37 so that no current will flow therein unless the input voltage is of a positive value which exceeds voltage source 38. In like manner, no current will flow in series path 36 unless the input voltage is of a negative value in excess of source 38.

The paths 35, 36 are connected to the input of operational amplifier 39, while the output of the latter is fed directly to relay coil A. The parameters of the amplifier are chosen so that no output signal is produced in the absence of an input signal and thus the relay remains normally deenergized. If, however, the $u$ vector is of a magnitude which exceeds the value chosen for voltage sources 38, it will be coupled to the input of high gain amplifier 39, by one of the series paths, and an output will thus be produced by said amplifier to energize the relay coil A.

The output of limiter 32 is, in like fashion, fed to limiter 34 for the purpose of energizing the relay coil B should the $v$ vector exceed a preselected amplitude in the positive or negative direction. It should be noted that the selected minimum values for the $v$ vector need not be the same as that selected for the $u$ vector and, further, these minimum values can be different for the positive and negative directions.

Figure 5B:
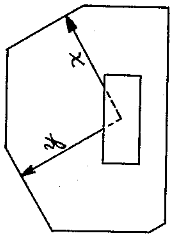
FIGS. 5A and 5B are vector diagrams useful in explaining the operation of the system of FIG. 5.
Figure 5A:
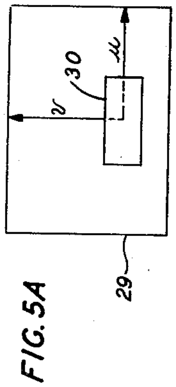

Let it now be assumed desirable to provide the rectangular vector pattern 29 of FIG. 5A with a rectangular hole or region therein (30) in which the total vector is not permitted to fall. The minimum limits chosen for both the $u$ and $v$ vectors are the same for the positive and negative directions, but the minimum value to which the $u$ vector is limited is assumed to exceed that to which the $v$ vector is limited. It will be understood, of course, that any desired limits can be set for the $u$ and $v$ vectors simply by using voltage sources 38 of appropriate values.

If the limited vector quantities $u$ and $v$, from the limiters 31 and 32, are both of a value less than the minimum value selected therefor, neither of the relay coils A and B will be energized and hence neither of the vector quantities $u$, $v$ will be delivered to rotator 13. If, however, one, or both, of the vector quantities exceeds, in either the positive or negative direction, the preselected minimum limits, the associated relay coil, or coils, will be energized. The energization of either relay coil closes the associated switch contacts with the result that the $u$ and $v$ vectors are both delivered to the rotator 13. Accordingly, the $u$ and $v$ vectors are always passed on to the rotator 13 when either, or both, exceed the minimum value set therefor. The result of this operation is illustrated in FIG. 5A wherein the rectangular pattern 29 is shown provided with a minimum restricted region or hole 30.

The rotator 13 is similar to that shown in FIG. 1 and, in like manner, it rotates vectors $u$ and $v$ through a predetermined angle, which in FIG. 5B is shown as thirty degrees. These rotated vectors are then delivered to limiters 14, 15 wherein they are limited to any selected extent. In the case illustrated in FIGS. 5A and 5B, the maximum limits imposed on the $u$, $x$, $y$ and $+v$ vectors are equal, only the limiting of the $v$ vector in the negative direction being different. Again, it will be realized that the total vector can be limited to a wide variety of patterns and, in similar fashion, the hole or minimum restricted region can be of a variety of shapes.

Figure 6A:
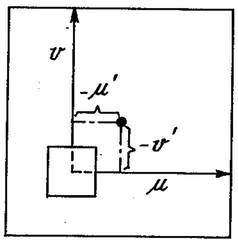
FIGS. 6A and 6B are vector diagrams useful in explaining the operation of the FIG. 6 embodiment of the invention.

FIG. 6 illustrates another manner of providing a given vector pattern with a hole or restricted region located therein. The limiters 41 through 44 are similar in nature to the limiters of FIG. 5 numbered 31 through 34, respectively. Accordingly, with the orthogonal component quantities $u$, $v$ delivered thereto, a total vector pattern such as shown in FIG. 6A can be achieved. In FIG. 6A, the vector quantities $u$, $v$ are both substantially limited, in maximum amplitude, in the negative direction and thus the hole is made to appear in the lower left-hand corner of the total vector pattern. It will be readily seen, however, that by selection of the maximum limits imposed upon the $u$ and $v$ vectors the hole can be made to appear in any other desired position in said pattern.

The vector quantities $u$, $v$ are limited and then fed, respectively, to a pair of adders or summing amplifiers 49, 50 along with a pair of negative, direct current, biasing potentials $u'$, $v'$. The negative biasing potential $u'$ has the effect of shifting the origin of the $u$ vector to the right, as shown in FIG. 6A. In like manner, the negative biasing potential $v'$ when added to the vector quantity $v$ effectively shifts the origin thereof in the upward or positive direction. That is, the $v$ vector is reduced in amplitude in the positive direction by an amount equal to the negative biasing potential $v'$. Such a shifting, of course produces no effect on the overall shape of the vector pattern.

The output signals from adders 49 and 50 are delivered to the rotator 13 and then after rotation to the limiters 14 and 15.

Figure 6B:
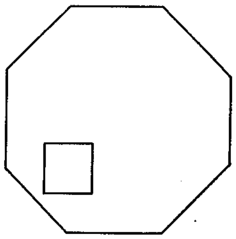

If the initial limiting applied to the $u$ and $v$ vectors is identical, the total vector pattern, at this stage, will be a square with the point of origin of the component vectors located at some position from the center thereof. This is the situation assumed in FIG. 6A. Now if said origin is shifted to the center of this square, by means of additive biasing potentials as shown, and a forty-five degree rotation is applied, followed by an equivalent square limiting, the total vector pattern will appear as an octagon with a hole or restricted region therein, as shown in FIG. 6B.

Since, as previously explained, the degree of rotation or limiting may be of any extent, it will be clear that almost any two dimensional vector pattern can be achieved and a hole or restricted region can be provided therein at any position. Also, the hole may be of any size or shape. For example, the hole could assume a square or rectangular configuration by simply controlling those potentials which determine the minimum values for the $u$ and $v$ vectors. And, as the shape of the total vector pattern can be made to assume an octagonal, or other, configuration simply by successive limiting and rotation, so in like fashion the hole could be made octagonal or otherwise.

Figure 7:
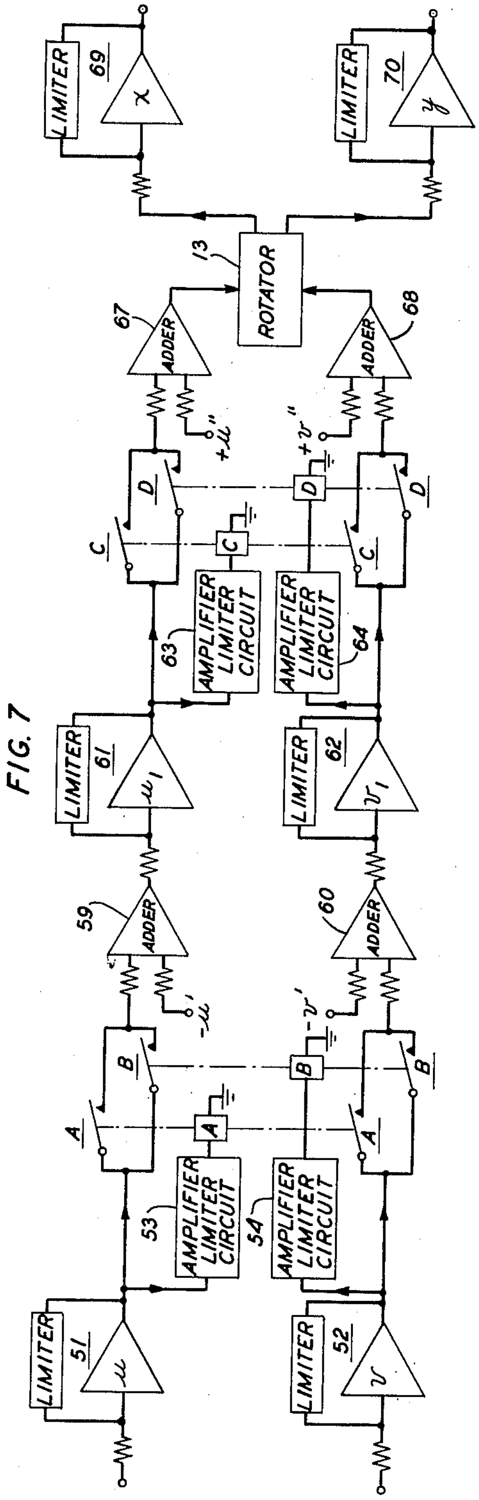
FIG. 7 is a schematic diagram of a still further embodiment of the present invention.
Figures 7A, 7B, 7C, 7D, 7E:
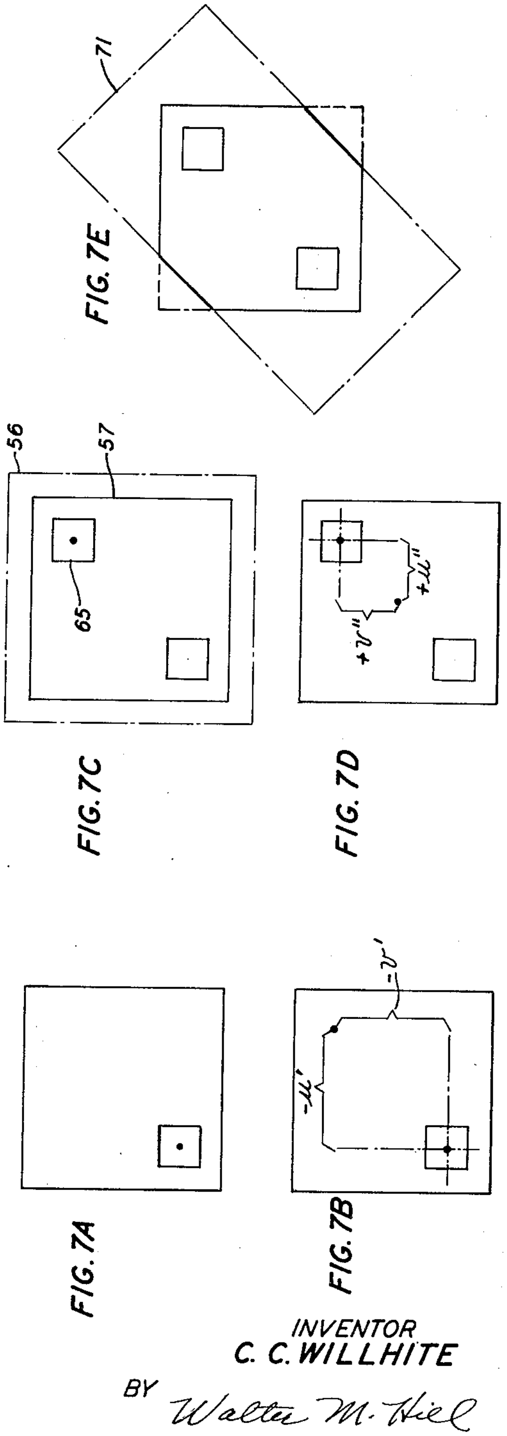
FIGS. 7A to 7E are vector diagrams useful in explaining the operation of the embodiment shown in FIG. 7.

FIG. 7 is a further modification of the present invention wherein the total vector pattern is provided with a plurality of holes or restricted regions. The limiters 51 through 54 are similar to the limiters of FIG. 6 numbered 41 through 44, respectively, and hence the total vector will initially be limited as shown in FIG. 7A. The limited vector quantities $u$ and $v$ are then delivered to the pair of adders 59 and 60, respectively, along with negative biasing potentials $u'$, $v'$. As in the case of FIG. 6, these biasing potentials serve to displace the origin a predetermined amount dependent upon their magnitude. This displacement is shown in FIG. 7B.

The output signals from the adders 59, 60 are fed to a second set of limiters 61, 62. These limiters are in essence the same as limiters 51, 52 with the exception that the maximum limits imposed are chosen so that the total vector pattern defined thereby falls outside the vector pattern established by limiters 51, 52. As illustrated in FIG. 7C, the total vector pattern 56 established by limiters 61, 62 encompasses in all directions the vector pattern 57 established by limiters 51, 52. The pattern 56 includes, in addition, a hole or restricted region 65 formed by the combined action of limiters 63 and 64 and relay units C and D. Thus, at this point the total vector is limited to the area of overlap between the successively established vector patterns, which area of overlap or superposition is defined by the vector pattern 57. However, two holes or restricted regions have now been provided in pattern 57 within which the total vector is not permitted to fall.

The output signals from limiters 61 and 62 are delivered, via the switch contacts C, D, to the adder circuits 67, 68 where they are respectively added to positive biasing potentials $u''$, $v''$. These positive biasing potentials produce a result the opposite of negative biasing potentials $u'$, $v'$ and hence the origin is shifted to the left and downward as illustrated in FIG. 7D. These positive biasing potentials are of a lesser magnitude than the negative biasing potentials $u'$, $v'$.

The adders 67, 68 are coupled to the input of rotator 13, while the output of the latter is coupled to the input of limiters 69, 70. Assuming a forty-five degree rotation, the vector pattern established by limiters 69, 70 appears as illustrated at 71 in FIG. 7E, the total vector pattern thus being indicated by the solid lines.

Accordingly, a total vector pattern can be achieved having one or more holes or restricted regions therein at preselected positions. Such a pattern could find use, for example, in automatic machine processes in those situations where it is necessary to mill, plane or cut certain regions of a surface while omitting others.

Figure 8:
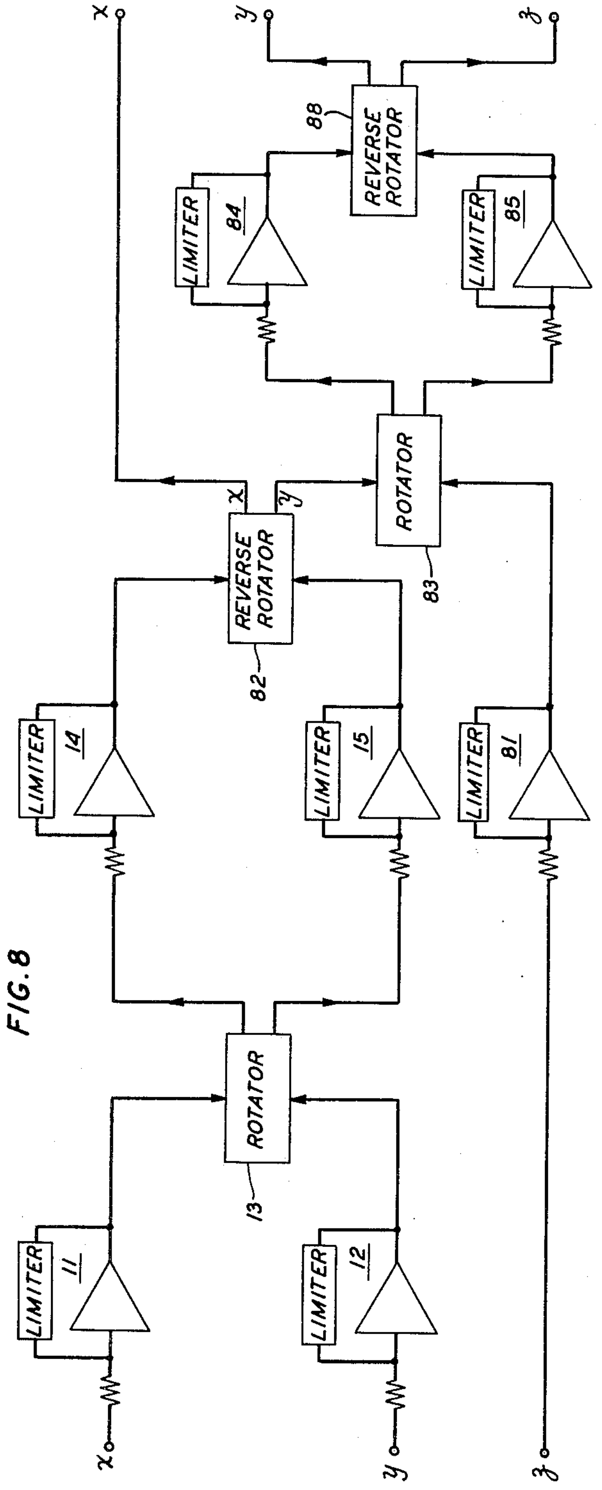
FIG. 8 is an embodiment of the invention wherein the total vector is limited to a predetermined three dimensional pattern.
Figure 8D:
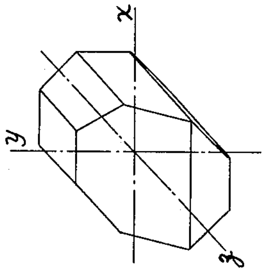
FIGS. 8A to 8D are vector diagrams useful in the explanation of the three dimensional system of FIG. 8.
Figure 8C:
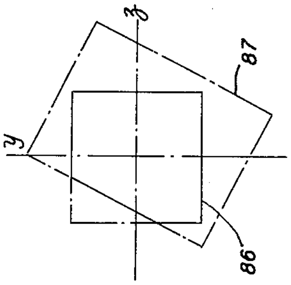
Figure 8B:
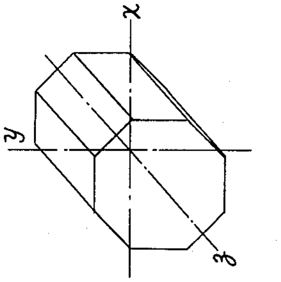
Figure 8A:
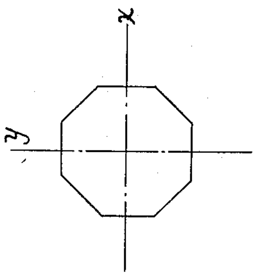

FIG. 8 shows a system in accordance with the present invention wherein the total vector is limited in three dimensions. The limiters 11, 12, 14 and 15 and the rotator 13 function in the same manner as the identically numbered elements of the FIG. 1 system, and hence the total vector will be limited to an octagon in the $x$—$y$ plane, as illustrated in FIG. 8A. If maximum limits are now imposed upon the $z$ vector in limiter 81, the total vector will be limited to a three dimensional pattern such as shown in FIG. 8B.

Such a three dimensional limiting will for many purposes prove sufficient. However, still further limiting of the total vector pattern is possible. For example, with the system shown in FIG. 8, the total vector may be limited further in the $y$—$z$ plane. To this end, the output signals from limiters 14 and 15 are fed to a reverse rotator 82. This rotator is similar in nature to the rotator 13 and merely serves to reverse the rotational effect produced by the latter. Thus, if rotator 13 provides a forty-five degree rotation of the $x$, $y$ vectors, the reverse rotator 82 returns the latter to their original axial positions. It will be clear to those skilled in the art that such a reverse rotation may or may not be needed depending upon the additional limiting to be performed. In the present case, it has been assumed desirable to limit the three dimensional pattern in a predetermined manner with respect to the original , $x$, $y$ and $z$ axes.

The vectors lying along the $y$ and $z$ axes are delivered to the rotator 83 from the reverse rotator 82 and limiter 81, respectively, and after a predetermined degree of rotation, the rotated vector quantities are fed to limiters 84 and 85. From FIG. 8B, it will be seen that the total vector is initially limited to a square in the $y$—$z$ plane. In FIG. 8C, this square 86 is shown symmetrically disposed about the intersection of the $y$, $z$ axes and superimposed thereon is a rectangular limit pattern 87 established by the rotator 83-limiter 84, 85 combination. As previously explained, the total vector will thus be limited in the $y$—$z$ plane to the common area of the superimposed patterns, as illustrated by solid lines in FIG. 8C. This limiting in the $y$—$z$ plane, taken in combination with the octagonal limiting in the $x$—$y$ plane, results in a three-dimensional limit pattern such as shown in FIG. 8D.

The vector quantities from limiters 84 and 85 are delivered to reverse rotator 88, which serves to reverse the rotational effect produced by rotator 83. Thus, the output vectors quantities, $x$, $y$ and $z$ are returned to their original axial positions, but the vector sum thereof is limited to the three dimensional pattern of FIG. 8D.

Essentially, the present invention relates to the concept of selectively limiting a total vector quantity which is composed of two or more component vector quantities. The component vector quantities may represent the analogs of the same or different types of data. For example, when a force or pressure acts throughout a period of time, it may be desirable to limit the force-time relationship in a manner whereby a given maximum force is permitted to act only for a short period and as the applied force decreases the said period increases in some selected way.

Function generators based on the utilization of diode characteristics may be used at signal frequencies well into the megacycle region. If the vector signals to be limited are alternating current, a special rotatable transformer called a resolver is utilized to provide the necessary rotation or transformation.

While the present invention has been described by reference to particular embodiments thereof, it will be understood that numerous modifications may be made by those skilled in the art without actually departing from the spirit and scope of the invention.

What is claimed is:

1. In a system for selectively limiting a total vector quantity which is comprised of component vector quantities, means for limiting each of said component vector quantities between selected limits, means for transforming the limited component vector quantities into second vector quantities which are angularly disposed with respect to said limited vector quantities, and means coupled to the output of the transforming means for limiting each of said second vector quantities between selected limits.

2. In a system for selectively limiting a total vector quantity which is comprised of two or more component vector quantities, means for imposing selected limits on each of said component vector quantities so that the vector sum thereof is restricted to a first predetermined vector pattern, means for transforming the limited component vector quantities into second vector quantities which are angularly disposed with respect to said limited component vector quantities, and means coupled to the output of the transforming means for imposing limits on each of said second vector quantities so that the vector sum of said second vector quantities is restricted to a second predetermined vector pattern, whereby the total vector quantity is restricted to a total vector pattern which is defined by said first and second vector patterns.

3. In a system for selectively limiting the magnitude of a total vector quantity which is comprised of orthogonal component vector quantities, means for limiting the amplitude of each of said orthogonal vector quantities between selected limits, means for rotating the limited orthogonal vector quantities through a given angle, and means coupled to the output of the rotating means for limiting the amplitude of each of the rotated vector quantities between selected limits.

4. In a system for limiting the magnitude of a total vector quantity which is comprised of a pair of orthogonal component vector quantities, means for limiting the amplitude of said pair of orthogonal component vector quantities to the same extent in both the positive and negative directions, means for rotating the limited orthogonal component vector quantities through a preselected angle, and means coupled to the output of the rotating means for limiting the amplitude of the rotated orthogonal component vector quantities to the same extent as the limits imposed by the first-mentioned means, whereby the total vector quantity is limited to an octagon.

5. In a system for limiting the magnitude of a total vector quantity which is comprised of two component vector quantities, means for limiting the amplitude of each of said component vector quantities between selected maximum and minimum values, means for rotating the limited component vector quantities through a predetermined angle, and means coupled to the output of the rotating means for limiting the amplitude of the rotated component vector quantities between selected limits.

6. In a system for selectively limiting a total vector quantity which is comprised of a pair of orthogonal component vector quantities, means for imposing selected limits on each of said component vector quantities so that the vector sum thereof is limited to a first vector pattern, means coupled to the first-mentioned means for providing at least one region within said vector pattern in which the total vector quantity is not permitted to fall, means for transforming the limited component vector quantities into second vector quantities which are angularly disposed with respect to said limited component vector quantities, and means coupled to the output of the transforming means for imposing selected limits on each of said second vector quantities.

7. In a system for selectively limiting a total vector quantity which is comprised of two component vector quantities, limiter means for imposing selected limits on each of said component vector quantities so that the vector sum thereof is limited to a first vector pattern, means for transforming said limited component vector quantities into vector second quantities which are angularly disposed with respect to said limited component vector quantities, limiter means coupled to the output of the transforming means for imposing limits on each of said second vector quantities so that the vector sum of said second vector quantities is restricted to a second vector pattern whereby the total vector quantity is restricted to a total vector pattern which is defined by said first and second vector patterns, and means coupled to at least one of said limiter means for providing at least one region within said total vector pattern in which the total vector quantity is not permitted to fall.

8. In a system for selectively limiting a total vector quantity which is comprised of two component vector quantities, limiter means for imposing selected limits on each of said component vector quantities so that the vector sum thereof is limited to a first vector pattern, means for transforming said limited component vector quantities into second vector quantities which are angularly disposed with respect to said limited component vector quantities, limiter means coupled to the output of the transforming means for imposing limits on each of said second vector quantities so that the vector sum of said second vector quantities is restricted to a second vector pattern whereby the total vector quantity is restricted to a total vector pattern which is defined by said first and second vector patterns, and means coupled to at least one of said limiter means for providing a plurality of regions within said total vector pattern in which the total vector quantity is not permitted to fall.

9. In a system for limiting, to a predetermined three dimensional pattern, a total vector quantity which is comprised of three orthogonal component vector quantities, means for imposing selected limits on two of said orthogonal component vector quantities so that the vector sum thereof is limited to a first vector pattern, means for transforming said limited component vector quantities into second vector quantities which are angularly disposed with respect to said limited component vector quantities, means coupled to the output of the transforming means for imposing limits on each of said second vector quantities so that the vector sum of said second vector quantities is restricted to a second vector pattern, and means for limiting the other of said orthogonal component vector quantities between selected limits, whereby the total vector quantity is restricted to a total vector pattern which is defined by said first and second vector patterns and the limits imposed by the last-recited means.

10. In a system for limiting, to a predetermined three dimensional pattern, a total vector quantity which is comprised of three orthogonal component vector quantities, means for imposing selected limits on two of said orthogonal component vector quantities so that the vector sum thereof is limited to a first vector pattern, means for rotating the limited orthogonal component vector quantities through a given angle, means coupled to the output of the rotating means for imposing limits on each of the rotated orthogonal component vectors so that the vector sum thereof is limited to a second vector pattern, means for limiting the other of said orthogonal component vector quantities between selected limits, means for rotating the said other orthogonal component vector quantity and one of the former two limited orthogonal component vector quantities through a given angle, means coupled to the output of the last-mentioned rotating means for imposing selected limits on each of the orthogonal vector quantities rotated thereby so that the vector sum thereof is limited to a third vector quantity pattern, whereby the total vector is restricted to a total vector pattern which is defined by said first, second and third vector patterns and the limits initially imposed on said other orthogonal component vector quantity.

No references cited.